US009342525B1

(12) United States Patent
Wideman (10) Patent No.: US 9,342,525 B1
(45) Date of Patent: May 17, 2016

(54) MULTI-DEDUPLICATION

(71) Applicant: Quantum Corporation, San Jose, CA (US)

(72) Inventor: Rod Wideman, Shakopee, MN (US)

(73) Assignee: Quantum Corporation, San Jose, CA (US)

( * ) Notice: Subject to any disclaimer, the term of this patent is extended or adjusted under 35 U.S.C. 154(b) by 381 days.

(21) Appl. No.: 13/958,874

(22) Filed: Aug. 5, 2013

(51) Int. Cl.
*G06F 17/30* (2006.01)
(52) U.S. Cl.
CPC ................................ *G06F 17/30156* (2013.01)
(58) Field of Classification Search
CPC ............................................... G06F 17/30156
USPC .......................................................... 707/692
See application file for complete search history.

(56) References Cited

U.S. PATENT DOCUMENTS

| | | | | |
|---|---|---|---|---|
| 8,631,052 B1 * | 1/2014 | Shilane | ............. | G06F 17/30156 707/825 |
| 2012/0036113 A1 * | 2/2012 | Lillibridge | ............ | G06F 3/0608 707/694 |
| 2012/0239630 A1 * | 9/2012 | Wideman | ............ | G06F 11/1453 707/692 |
| 2013/0060739 A1 * | 3/2013 | Kalach | ............. | G06F 17/30159 707/692 |

* cited by examiner

*Primary Examiner* — Jensen Hu
(74) *Attorney, Agent, or Firm* — Eschweiler & Associates, LLC (57) ABSTRACT

Example apparatus and methods improve deduplication efficiency for a deduplication application or process. A first blocklet repository may have been created according to a first deduplication approach that was optimized for a first set of conditions. Example apparatus and methods create a second blocklet repository from the first blocklet repository by deduplicating the first blocklet repository using a second deduplication approach that is optimized for a second set of conditions. While the first blocklet repository may have been appropriate for the first set of conditions, the second blocklet repository may be appropriate for the second set of conditions. For example, conditions that exist for an immature repository or during ingest may be different than conditions that exist for a mature repository or for applications that use a repository rather than build a repository. The first and second repositories may reside on separate deduplication apparatus.

18 Claims, 8 Drawing Sheets

MULTI-DEDUPLICATION

BACKGROUND

A deduplication apparatus or process may create a repository of blocklets by deduplicating a data stream. The blocklets in the repository may have a size or other property that is related to the realities of the apparatus or process that created the blocklets and populated the repository with the blocklets. For example, the apparatus or process creating the blocklets may be optimized for ingest speed, for ease of file recreation, for minimizing the number of duplicates, for blocklet size distribution, or for other parameters. More generally, a deduplicator creating blocklets for a repository has one set of constraints. However, creating blocklets is only part of deduplication and a user of a repository may have a different set of constraints.

A repository may be used for a long period of time. A repository may be used by different entities for different purposes. Thus, the constraints that were in place when the repository was created, while appropriate for the ingest and creation phase of deduplication, may yield suboptimal performance for other entities at other times.

Figure 1:
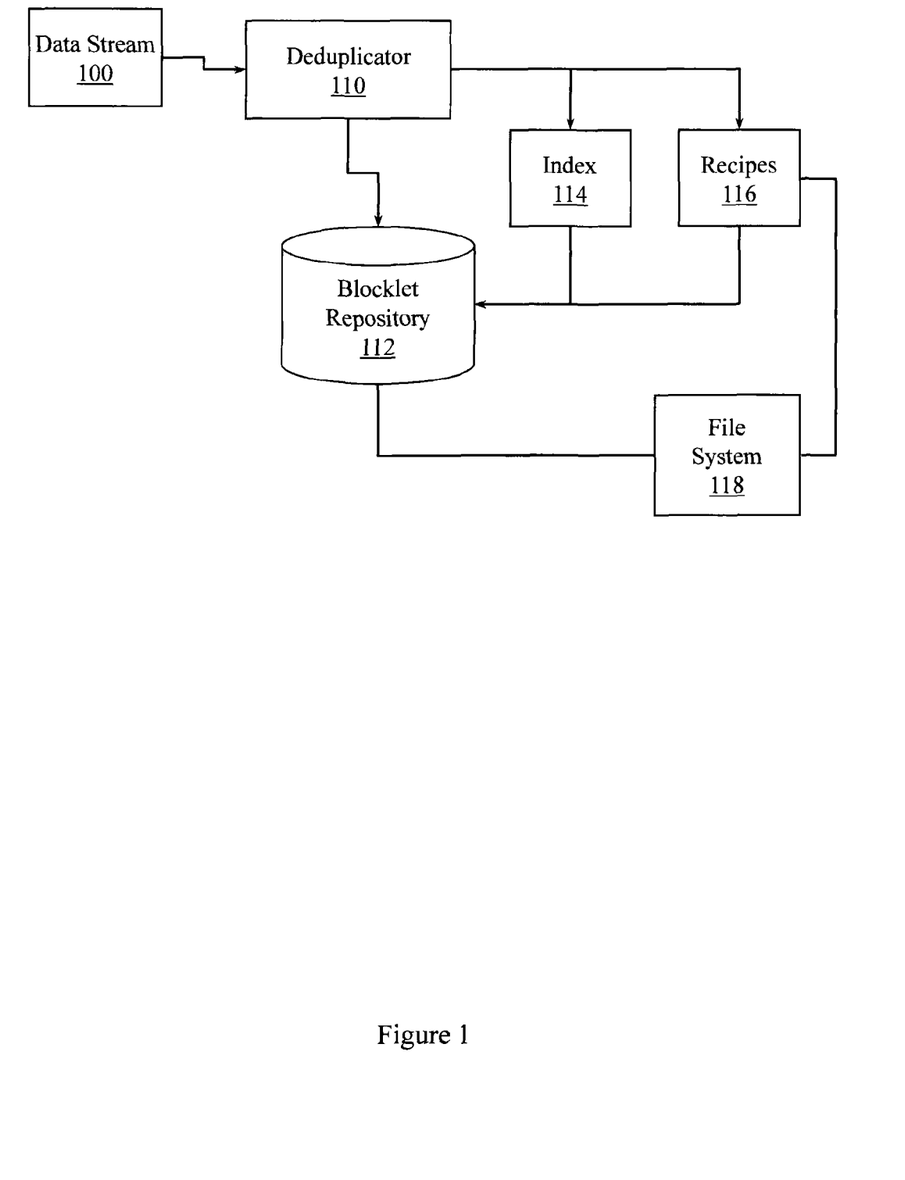
FIG. 1 illustrates an example single deduplication.

FIG. 1 illustrates a deduplicator 110 producing a blocklet repository 112 by deduplicating a data stream 100. To make the blocklet repository 112 usable, deduplicator 110 also creates an index 114 and recipes 116. The index 114 facilitates finding blocklets in the blocklet repository 112. The index 114 may be indexed using a hash of a blocklet. The recipes 116 facilitate recreating a file, binary large object (BLOB), or other collection of data that has been partitioned into blocklets that are stored in blocklet repository 112. A file system 118 may recreate a file by accessing a member of the recipes 116 and then retrieving blocklets from the blocklet repository 112 using the index 114 to locate the blocklets. FIG. 1 is an example of single deduplication where the data stream 100 is deduplicated once to create blocklet repository 112. Deduplicator 110 may perform deduplication like that described in U.S. Pat. No. 5,990,810 issued to Williams.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatus and methods perform multi-deduplication. Multi-deduplication refers to creating a new blocklet repository by deduplicating one or more existing blocklet repositories. An existing blocklet repository may have been created by deduplicating a data stream. A plurality of existing blocklet repositories may have been created by deduplicating a plurality of data streams. Multi-deduplication refers to performing additional processing on one or more existing blocklet repositories that were produced using a first set of assumptions, properties, and constraints to produce a new repository where the new repository is built under a second, different set of assumptions, properties, and constraints. "Deduplication," as used herein, refers to processes like those described in U.S. Pat. No. 5,990,810 issued to Williams.

Once a blocklet repository has been created, additional processing may be applied "from the other end" to produce additional savings or efficiencies for different entities. Recall that one part of deduplication is ingest and initial blocklet repository creation. Another part of deduplication is using the blocklet repository to recreate files, for backup, for replication, for distribution, or for other purposes. Recreation, backup, replication, or distribution may perform adequately using an initially created blocklet pool but may perform more optimally if the initial deduplication repository is deduplicated again using different parameters. The initial deduplication repository may be multiply deduplicated to create a production blocklet repository.

Ingest may not be a one-time affair. Ingest may be ongoing. Also, ingest may not occur at just a single site. A large organization may continually be ingesting data. While much of this data may be duplicate data, some of this data may be new or unique data. Therefore, a blocklet repository may constantly be changing to accommodate the new data. Memory, disk space, and even tape space are finite resources. Ingest may be challenged when an ingest repository and associated data structures (e.g., index, recipes for recreation) become too large. Therefore, a blocklet repository associated with an ingest apparatus or process may be purged if it becomes too full, periodically, or at other times. Before purging, the ingest repository may be reconciled with the production repository.

Additionally, ingest may occur in parallel at a number of widely distributed locations. Different apparatus or processes at different locations may produce their ingest repositories using different parameters. Rather than try to keep the production repository up-to-date in real-time, local ingest blocklet repositories may be created from data ingested at a certain location during a certain period of time. Periodically, or when an efficient transfer of ingest blocklet repositories can be made, the multiple ingest repositories that are being created in parallel may be reconciled to the production repository. When the multiple ingest repositories were created using different parameters, the reconciliation process provides an opportunity to standardize into a single set of parameters used by the production repository.

Recreation, backup, replication, distribution, or other applications may perform better when the blocklets produced by an ingest appliance or process are deduplicated again to update the multiply deduplicated production blocklet repository. The multiple deduplication may be used to produce a production repository from a single ingest repository or other single repository. The multiple deduplication may also be used to produce a production repository from a number of other repositories. The production repository may have blocklets with a different (e.g., finger-grained) size. File recreation recipes that initially pointed to the existing repository may be updated with information about the blocklets in the production repository.

Figure 2:
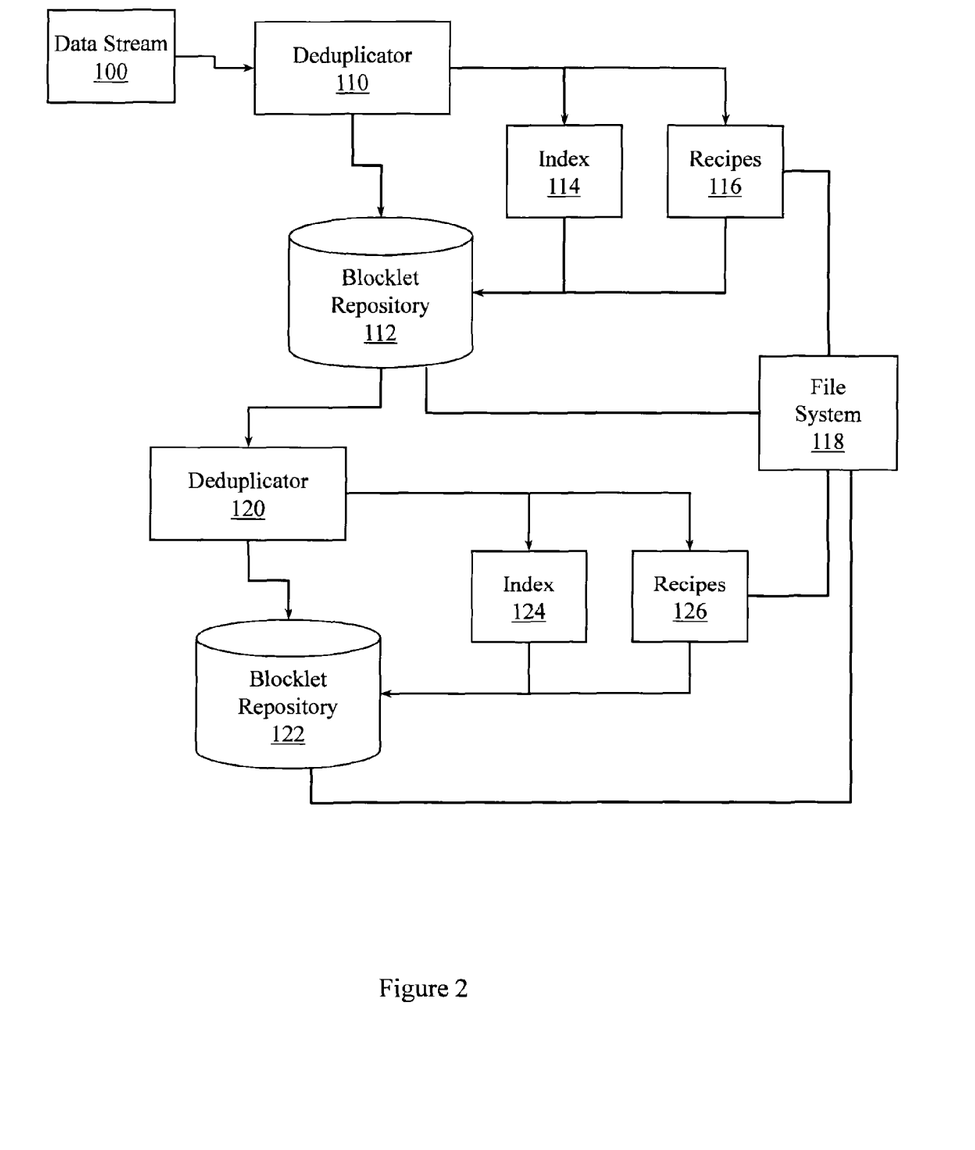
FIG. 2 illustrates an example multi-deduplication.

FIG. 2 illustrates an example multi-deduplication. A deduplicator 110 produces a blocklet repository 112 by deduplicating data stream 100. The deduplicator 110 also produces an index 114 and recipes 116. Another deduplicator 120 produces another blocklet repository 122. Instead of deduplicating a conventional data stream (e.g., data stream 100), deduplicator 120 deduplicates blocklet repository 112. Deduplicator 120 also produces an index 124 and recipes that facilitate using blocklet repository 122.

In one embodiment, file system 118 may recreate a file using recipes 116 and blocklet repository 112. In another embodiment file system 118 may recreate a file using recipes 126 and blocklet repository 122. In yet another embodiment, file system 118 may recreate a file using recipes 116, blocklet repository 112, recipes 126, and blocklet repository 122.

Figure 3:
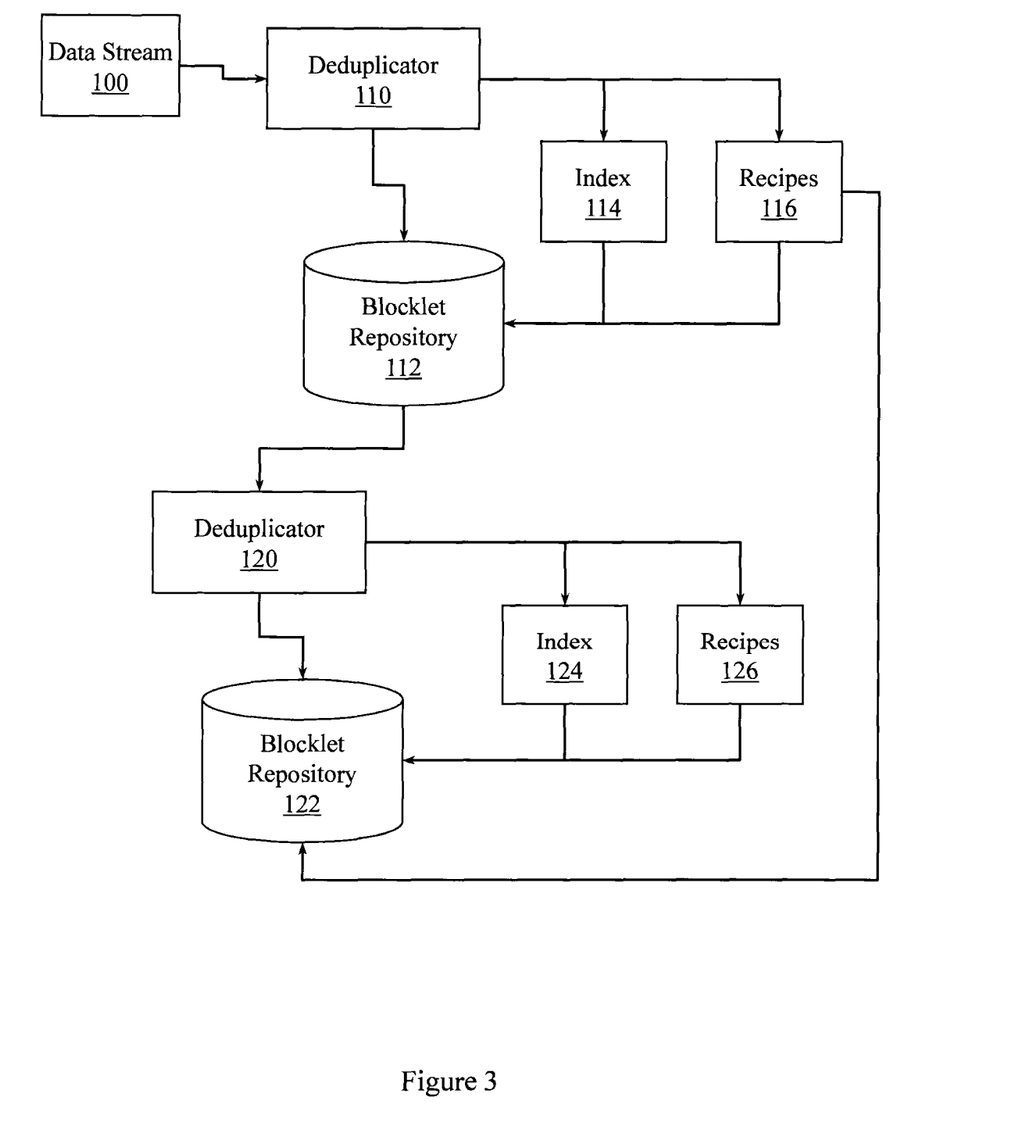
FIG. 3 illustrates an example multi-deduplication.

FIG. 3 illustrates an example multi-deduplication where recipes 116 are updated to point to blocklets in blocklet repository 122. For example, when all the data in a blocklet from blocklet repository 112 has been stored in one or more blocklets in blocklet repository 122, then that blocklet may be removed from blocklet repository 112. Since the blocklet has been removed from blocklet repository 112, recipes 116 may be updated to point to the replacement blocklet(s) in blocklet repository 122. In different embodiments, blocklet repository 112 and blocklet repository 122 may reside in different apparatus, in different data stores, in a single apparatus, or in a single data store. In different embodiments, deduplicators 110 and 120 may be different processes, may be different apparatus, may be different instances of a single process, may be a single process, or may be a single apparatus.

Figure 4:
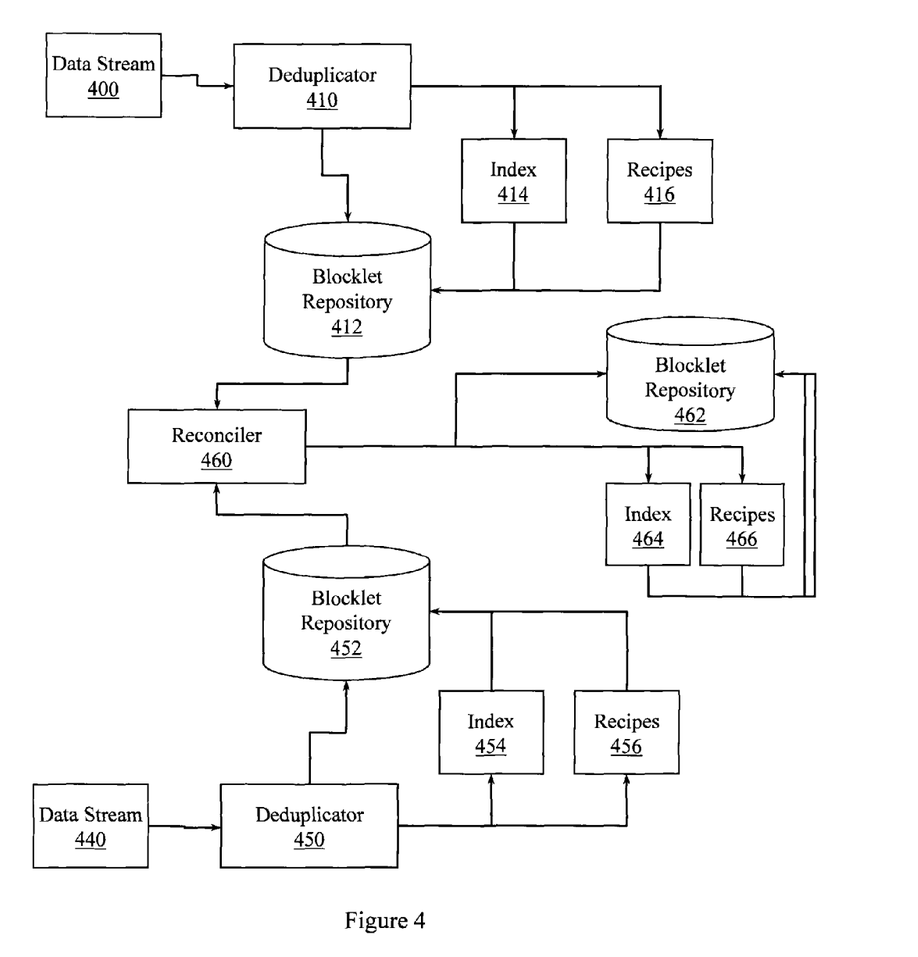
FIG. 4 illustrates an example multi-deduplication.

FIG. 4 illustrates an example multi-deduplication where a reconciler 460 produces a blocklet repository 462 by deduplicating two existing blocklet repositories (e.g., blocklet repository 412, blocklet repository 452). Deduplicator 410 may deduplicate data stream 400 to produce blocklet repository 412. Similarly, deduplicator 450 may deduplicate data stream 440 to produce blocklet repository 452. While two existing blocklet repositories are illustrated, more generally, reconciler 460 may produce blocklet repository 462 from one or more existing blocklet repositories. Reconciler 460 may also produce an index 464 and recipes 466 to facilitate using the blocklets stored in blocklet repository 462. The index 464 and recipes 466 may be used to supplement or replace index 414, recipes 416, index 454, or recipes 456.

While two separate existing blocklet repositories (e.g., blocklet repository 412, blocklet repository 452) are illustrated, in one embodiment the "two" repositories may actually be the same physical repository but viewed at different points in time. For example, blocklet repository 412 may represent blocklets that were produced during a first period of time and blocklet repository 452 may represent blocklets that were produced during a second period of time. In this embodiment, reconciler 460 may reconcile the two different time periods to produce blocklet repository 462.

Blocklet repository 412 may have been created using a first set of assumptions, constraints, or parameters (e.g., minimum blocklet size, maximum blocklet size, boundary placement condition) and blocklet repository 452 may have been created using a second, different set of assumptions, constraints, or parameters. Reconciler 460 may deduplicate blocklet repository 412 and blocklet repository 452 using a third, different set of assumptions, constraints, or parameters to produce blocklet repository 462. Blocklet repository 412 and blocklet repository 452 may be produced to optimize, for example, for ingest speed, while blocklet repository 462 may be produced to optimize for a different condition (e.g., maximize space saved, minimize duplicates, minimize file recreation time, minimize replication time, minimize backup time). In different embodiments, repositories 412, 452, and 462 may reside on different apparatus, on different data stores, on a single apparatus, or in a single data store. In different embodiments, reconciler 460 and deduplicators 410 and 450 may be separate apparatus, may be a single apparatus, may be separate processes, or may be separate instances of a single process.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
SSD: solid state drive
SAN: storage area network.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Figure 5:
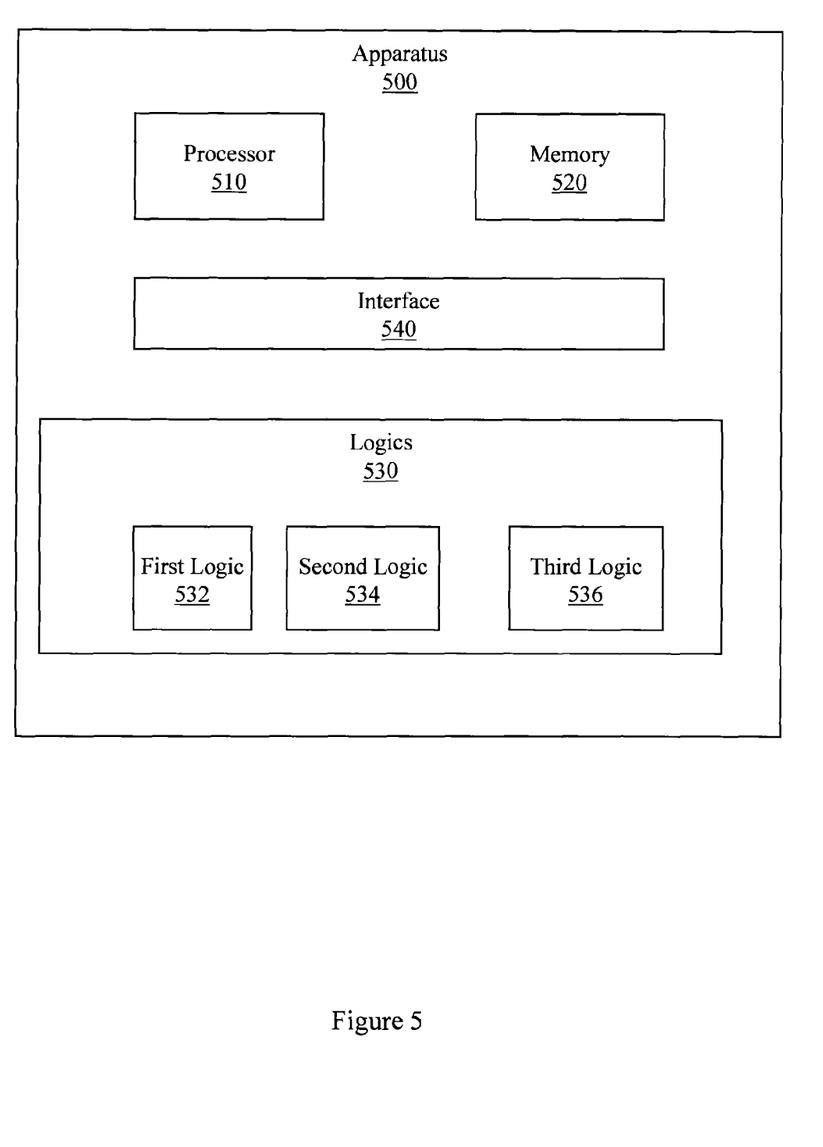
FIG. 5 illustrates an example apparatus associated with multi-deduplication.

FIG. 5 illustrates an apparatus 500 that includes a processor 510, a memory 520, and a set 530 of logics that is connected to the processor 510 and memory 520 by an interface 540. The processor 510 may be, for example, a microprocessor in a computer, a specially designed circuit, a processor in a mobile device, a system-on-a-chip, a dual or quad processor, or other computer hardware. Apparatus 500 may be, for example, a computer, a laptop computer, a tablet computer, a personal electronic device, a smart phone, a system-on-a-chip (SoC), or other device that can access and process data.

The memory 520 may be configured to store portions of a blocklet repository, portions of an index associated with the blocklet repository, portions of a set of recipes for recreating items (e.g., files) from blocklets stored in a blocklet repository, or other data. The memory 520 may be configured to store a blocklet produced by a deduplication apparatus or process.

The set 530 of logics may include a first logic 532 that is configured to access data in one or more existing blocklet data stores. The one or more existing blocklet data stores were populated by a deduplication apparatus or process that was controlled by one or more first deduplication constraints. The first deduplication constraints may include, for example, minimum blocklet size, maximum blocklet size, boundary placing approach, hash function, or other constraints. Accessing data in an existing blocklet data store may include, for example, copying a blocklet from the data store, receiving a blocklet from a data store, mounting a file, mounting a file system, establishing a socket for communicating with the data store, communicating with a deduplication apparatus, or other action.

The apparatus 500 may also include a second logic 534 that is configured to create blocklets for a new blocklet data store by deduplicating the one or more existing blocklet data stores. The one or more existing blocklet data stores may reside on one or more separate data deduplication apparatus. Deduplicating the one or more existing blocklet data stores may include, for example, presenting the blocklets from the existing data store as a data stream to the second logic 534. Deduplicating the one or more existing blocklet data stores may also include, for example, presenting files to the second logic 534 recreated using file recipes associated with the existing blocklet data store. The second logic 534 is controlled by one or more second deduplication constraints that differ in at least one way from the one or more first deduplication constraints. For example, the second logic 534 may use a different chunking and hashing approach. The chunking may be different due to, for example, different boundary placing approaches. The hashing may be different due to, for example, a different hashing function. In one embodiment, the one or more second deduplication constraints may cause the average blocklet size in the new blocklet data store to be smaller than the average blocklet size in the one or more existing blocklet data stores. In another embodiment, the one or more second deduplication constraints may cause the new blocklet data store to have fewer blocklets than the combined total number of blocklets in the one or more existing blocklet data stores at the time they were deduplicated while still providing one hundred percent coverage of data stored in the one or more existing blocklet data stores. More generally, the one or more second deduplication constraints cause the new blocklet data store to have different properties than the one or more existing blocklet data stores.

The apparatus 500 may also include a third logic 536 that is configured to selectively reconfigure a data structure associated with an existing blocklet data store. The data structure may be, for example, an index associated with an existing blocklet data store, a recipe for recreating a file, BLOB, or other collection of data from the existing blocklet data store, or other data structure. The reconfiguring may cause index hits or recipe hits to yield blocklets from the new blocklet data store instead of the existing blocklet data store.

In one embodiment, the third logic 536 may be configured to delete a chosen blocklet from an existing blocklet data store. The chosen blocklet may be deleted upon determining that data covering the chosen blocklet has been placed in the new blocklet data store. Data "covering" the chosen blocklet is data from which the chosen blocklet could be recreated or data from which an item that relied on the chosen blocklet for recreation could be recreated. For example, if the chosen blocklet contained text from a portion of file A, then data "covering" the chosen blocklet would include data from which the portion of file A could be recreated without loss of data.

In one embodiment, the third logic 536 may be configured to delete all the blocklets from an existing blocklet data store upon determining that data covering all the blocklets has been placed in the new blocklet data store. The deletion of chosen blocklets or entire sets of blocklets may be performed periodically, upon determining that an existing blocklet data store has been completely deduplicated, upon determining that an existing blocklet data store is full beyond a desired threshold, or at other scheduled or event driven times.

In one embodiment, the third logic 536 may be configured to reconfigure an index associated with an existing blocklet data store. In one example, an index to an existing blocklet data store may be reconfigured to point to one or more blocklets in the new blocklet data store. In another example, the index may be reconfigured to indicate that a blocklet no longer exists. The third logic 536 may also be configured to selectively reconfigure a recipe associated with recreating a file from an existing blocklet data store. For example, the recipe may be updated to point to one or more blocklets in the new blocklet data store.

Since the new blocklet data store is being built for some purpose (e.g., to improve efficiency in backup, replication, recreation), the third logic 536 may also be configured to selectively control a file system or other application to interact with the new blocklet data store and to not interact with the one or more existing blocklet data stores. Reconfiguring the file system may include, for example, changing data in a table, changing data in an inode, changing data in a file descriptor, or other action.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or can occur concurrently with other blocks from that shown and described. Moreover, fewer than all the illustrated blocks may be required to implement an example methodology. Blocks may be combined or separated into multiple components. Furthermore, additional or alternative methodologies can employ additional, not illustrated blocks.

Figure 6:
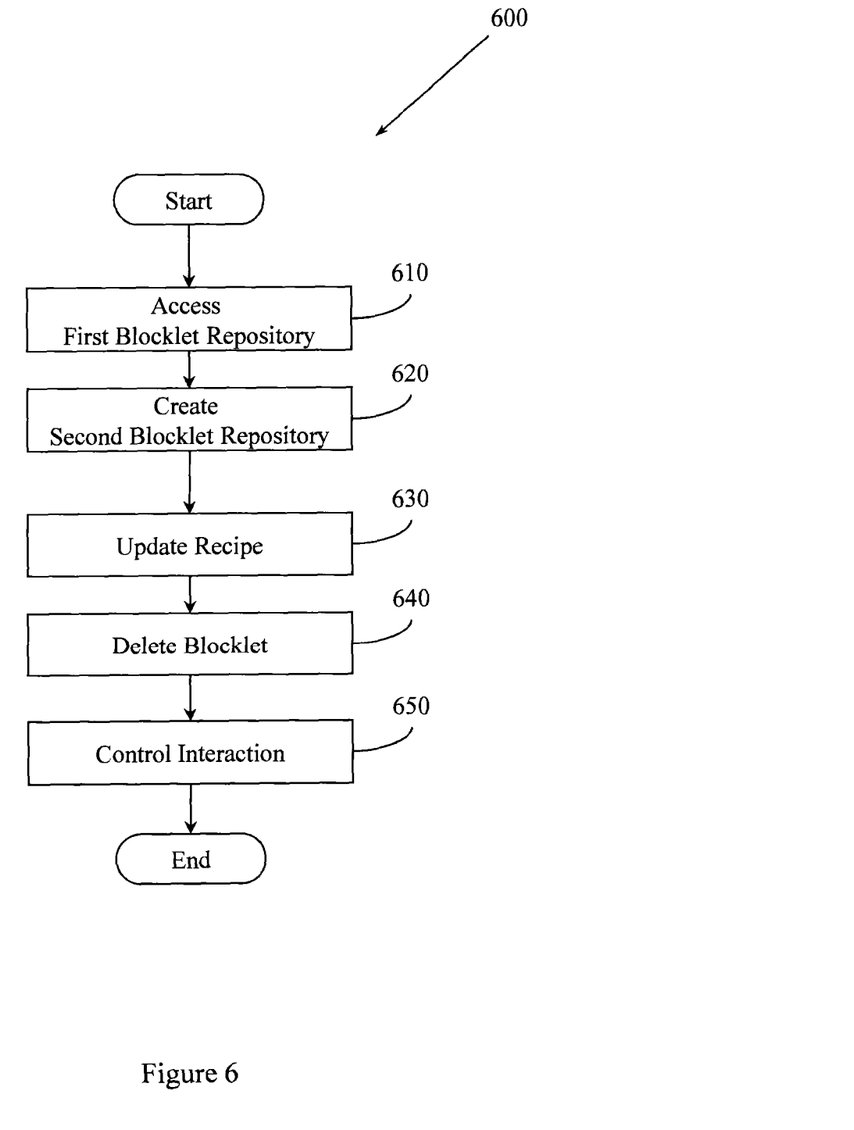
FIG. 6 illustrates an example method associated with multi-deduplication.

FIG. 6 illustrates a method 600 associated with multi-deduplication. Method 600 includes, at 610, accessing a first deduplication blocklet repository. The first deduplication blocklet repository may have been created by deduplicating a data stream as controlled by a first set of deduplication parameters. In one embodiment, the first set of deduplication parameters include a maximum blocklet size, a minimum blocklet size, a desired blocklet size distribution, a desired ingest speed, a boundary placing condition, a hash function, a duplicate determination condition, an amount of space reduction to achieve, or an item recreation time to achieve. The first set of deduplication parameters may be established to optimize deduplication for a first criteria (e.g., maximize ingest speed).

Method 600 may also include, at 620, creating a second, different deduplication blocklet repository. The second repository may be created by deduplicating the first blocklet repository as controlled by a second, different set of deduplication parameters. The second set of deduplication parameters may include a maximum blocklet size, a minimum blocklet size, a desired blocklet size distribution, a desired ingest speed, a boundary placing condition, a hash function, a duplicate determination condition, an amount of space reduction to achieve, or an item recreation time to achieve. The second set of deduplication parameters may be established to optimize deduplication for a second criteria (e.g., maximize space saved). In one embodiment, the second set of deduplication parameters will differ from the first set of deduplication parameters in at least one way. For example, the hash function may be different, the blocklet size may be different, a boundary placing approach may be different, or there may be other differences. Creating the second deduplication blocklet repository may include creating a second index and a second set of recipes for recreating items from the second deduplication blocklet repository.

The first blocklet repository may have a first index and a first set of recipes for recreating items from the first blocklet repository. Since the second repository is available and is optimized for a different action, method 600 may also include, at 630, accessing and updating a file recreation recipe associated with the first blocklet repository. While a file recreation recipe is described, more generally the recreation recipe may apply to a file, a BLOB, a record set, a table, or other collection of data for which a blocklet(s) has been stored and for which a recipe is available. Accessing the recipe may include, for example, copying data, receiving data, establishing a link to a server on which a recipe is available, establishing a socket for communicating with a recipe server, reading a recipe file, reading a recipe record, or other action. Updating the recreation recipe may include, for example, replacing a reference to one or more blocklets in the first blocklet repository with a reference to one or more blocklets in the second blocklet repository. By manipulating the recreation recipe, using the second repository instead of the first repository may be transparent to applications, processes, or apparatus that interact with the recreation recipes.

Method 600 may also include, at 640, selectively deleting a chosen blocklet from the first blocklet repository. The chosen blocklet may be deleted upon determining that data from the chosen blocklet is present in one or more replacement blocklets in the second blocklet repository and that all references to the chosen blocklet have been replaced by references to the one or more replacement blocklets. More generally, the chosen blocklet may be deleted when there is replacement data for the chosen blocklet and when the chosen blocklet will no longer be referenced.

Method 600 may also include, at 650, controlling a file system to recreate a file using the second deduplication blocklet repository, the second index, or the second set of recipes without using the first deduplication blocklet repository, without using the first index, and without using the first set of recipes. Once again, while a file system and files are described, more generally method 600 may include, at 650, controlling an entity to recreate an item using the second blocklet repository instead of the first. Even more generally, while recreating an item is described, method 600 may include, at 650, controlling an entity to interact with the second blocklet repository instead of the first.

The recreating or other action need not use the two repositories mutually exclusively. Thus, in one example, method 600 may include controlling a file system or other application to recreate a file or to take another action using both the first deduplication blocklet repository and the second deduplication blocklet repository. In different embodiments, the two repositories may be located on two or more separate deduplication appliances, on two separate data stores, on a single deduplication apparatus, or in a single data store.

Figure 7:
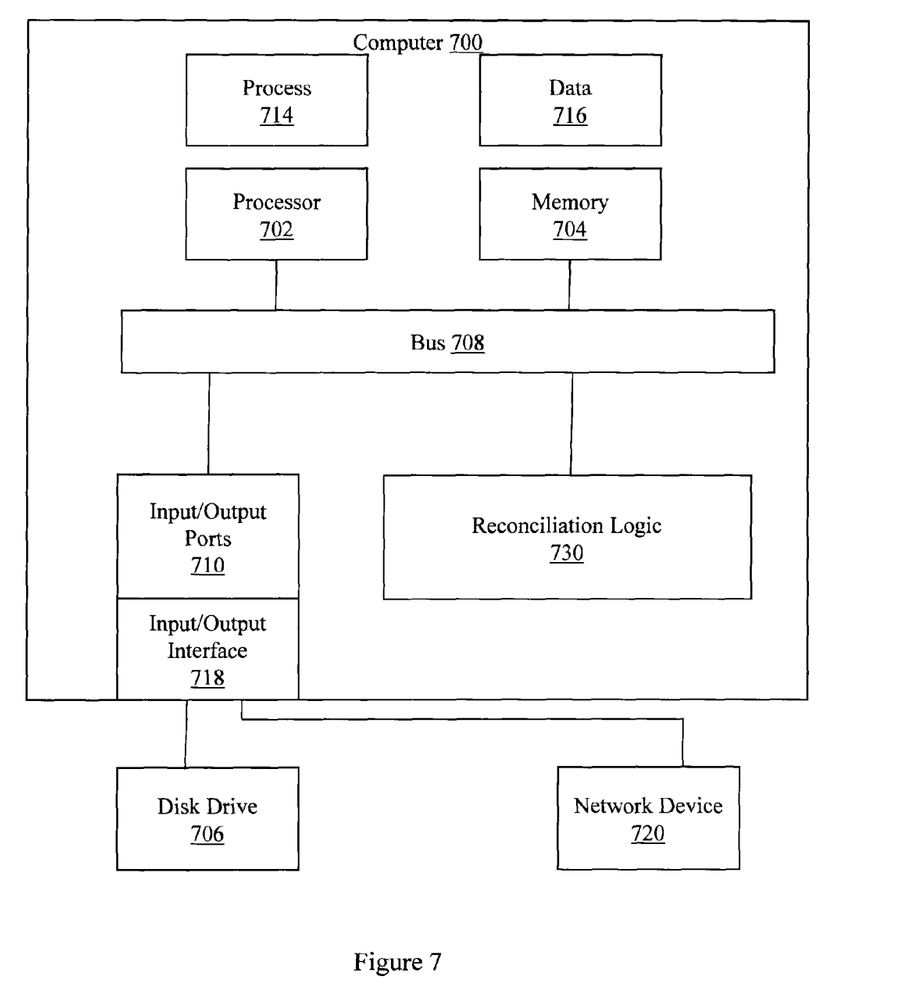
FIG. 7 illustrates an example apparatus associated with multi-deduplication.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a reconciliation logic 730 that is configured to produce a second blocklet repository by deduplicating one or more first blocklet repositories. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

Logic 730 may provide means (e.g., hardware, software, firmware) for improving deduplication efficiency for a deduplication application or process that is using a first blocklet repository. The first blocklet repository may have been created according to a first deduplication approach. Logic 730 may create a second blocklet repository from the first blocklet repository by deduplicating the first blocklet repository. Logic 730 may deduplicate the first blocklet repository using a different approach or parameters than were used to produce the first blocklet repository. Once the second blocklet repository is created, logic 730 may cause the deduplication apparatus or process to use the second blocklet repository instead of the first blocklet repository.

The means associated with logic 730 may be implemented, for example, as an ASIC. The means may also be implemented as computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multiprocessor architectures. A memory 704 may include volatile memory and/or non-volatile memory. Non-volatile memory may include, for example, ROM, PROM, and other memory. Volatile memory may include, for example, RAM, SRAM, DRAM, and other memory.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, or other device. Furthermore, the disk 706 may be a CD-ROM drive, a CD-R drive, a CD-RW drive, a DVD ROM drive, a Blu-Ray drive, an HD-DVD drive, or other device. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interface 718 and the input/output ports 710. Input/output devices may be, for example, a keyboard, a microphone, a pointing and selection device, cameras, video cards, displays, the disk 706, the network devices 720, and other devices. The input/output ports 710 may include, for example, serial ports, parallel ports, and USB ports.

The computer 700 can operate in a network environment and thus may be connected to the network devices 720 via the i/o interface 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

Figure 8:
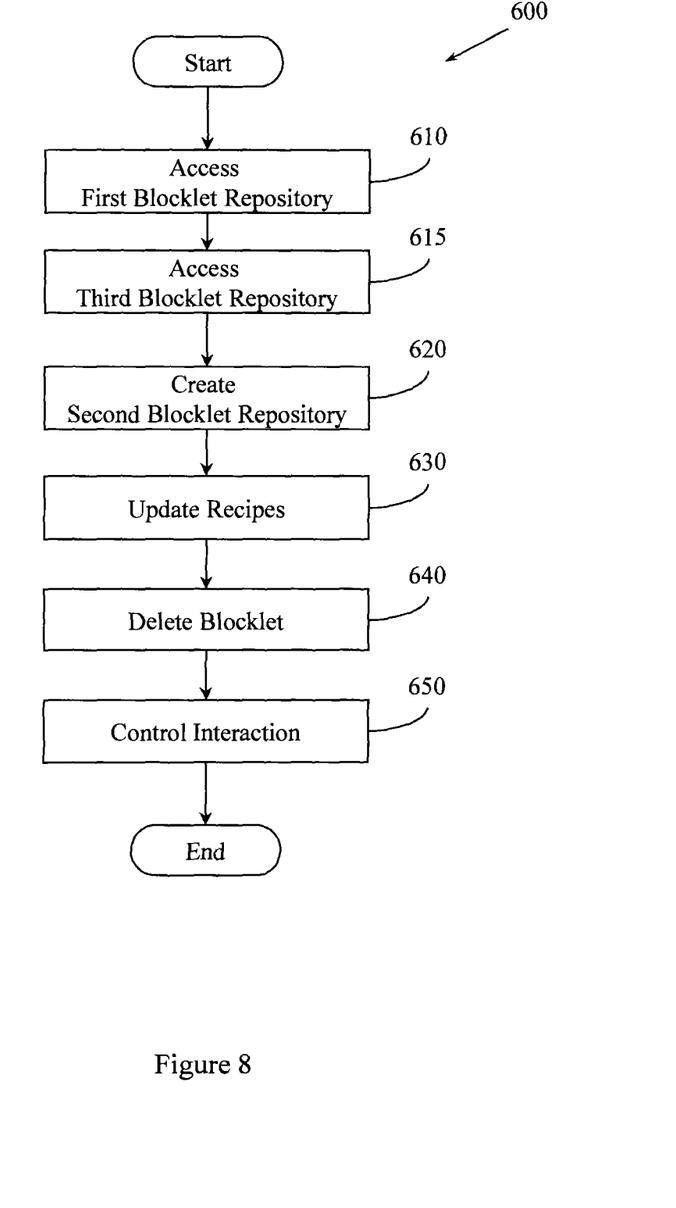
FIG. 8 illustrates an example method associated with multi-deduplication.

FIG. 8 illustrates another embodiment of method 600 (FIG. 6). This embodiment includes additional actions at 615. This embodiment of method 600 includes, at 615, accessing a third deduplication blocklet repository. The third deduplication blocklet repository may have been created by deduplicating a second, different data stream. In different embodiments, the second different data stream may have been deduplicated according to a third set of deduplication parameters or may have been deduplicated using the first set of deduplication parameters. In one embodiment, the first data stream and the second data stream may be taken from a single data stream at different points in time.

When two different existing blocklet repositories exist (e.g., first repository, third repository), creating the second, different deduplication blocklet repository at 620 may include deduplicating the two repositories. While two existing repositories are described, a greater number of repositories may be deduplicated to produce the second repository. Efficiencies may be gained by deduplicating the two or more existing repositories into a single repository. For example, while each repository may have removed duplicates locally, there may be duplicate blocklets between the repositories.

When multiple existing repositories are deduplicated into a single (e.g., production) repository, blocklets may be selectively deleted from the different existing repositories. Additionally, recipes associated with multiple existing repositories may be updated. Thus, updating recipes at 630 may also include replacing a reference to one or more blocklets in the third blocklet repository with a reference to one or more blocklets in the second blocklet repository. Similarly, deleting blocks at 640 may include selectively deleting a chosen blocklet from the third deduplication blocklet repository. The blocklet may be deleted upon determining that data from the chosen blocklet is present in one or more replacement blocklets in the second deduplication blocklet repository and that references to the chosen blocklet have been replaced by references to the one or more replacement blocklets.

Since blocklets from the third repository may have been replaced, and since recipes may have been updated, controlling the recreation logic at 650 may include causing the recreation logic to recreate an item using the second deduplication blocklet repository without using the first deduplication blocklet repository and without using the third deduplication blocklet repository.

In one example, a method may be implemented as computer executable instructions. Thus, in one example, a computer-readable medium may store computer executable instructions that if executed by a machine (e.g., processor) cause the machine to perform method 600. While executable instructions associated with method 600 are described as being stored on a computer-readable medium, it is to be appreciated that executable instructions associated with other example methods described herein may also be stored on a computer-readable medium.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable device storing computer-executable instructions that when executed by a computer cause the computer to perform a method, the method comprising:
    accessing a first deduplication blocklet repository that was created by deduplicating a first data stream as controlled by a first set of deduplication parameters;
    accessing a third deduplication blocklet repository that was created by deduplicating a second, different data stream as controlled by a third set of deduplication parameters; and
    creating a second, different deduplication blocklet repository by deduplicating the first blocklet repository and the third blocklet repository, where deduplicating the first blocklet repository and the third blocklet repository are controlled by a second, different set of deduplication parameters.

2. The non-transitory computer-readable device of claim 1, where the first set of deduplication parameters include a maximum blocklet size, a minimum blocklet size, a desired blocklet size distribution, a desired ingest speed, a boundary placing condition, a hash function, a duplicate determination condition, an amount of space reduction to achieve, or an item recreation time to achieve,
    where the second set of deduplication parameters include a maximum blocklet size, a minimum blocklet size, a desired blocklet size distribution, a desired ingest speed, a boundary placing condition, a hash function, a duplicate determination condition, an amount of space reduction to achieve, or an item recreation time to achieve,
    where the third set of deduplication parameters include a maximum blocklet size, a minimum blocklet size, a desired blocklet size distribution, a desired ingest speed, a boundary placing condition, a hash function, a duplicate determination condition, an amount of space reduction to achieve, or an item recreation time to achieve, and
    where the second set of deduplication parameters differs from the first set of deduplication parameters in at least one way, or where the second set of deduplication parameters differs from the third set of deduplication parameters in at least one way.

3. The non-transitory computer-readable device of claim 1, the method comprising: accessing an item recreation recipe associated with the first blocklet repository; and selectively updating the item recreation recipe to replace a reference to one or more blocklets in the first blocklet repository with a reference to one or more blocklets in the second blocklet repository.

4. The non-transitory computer-readable device of claim 3, the method comprising: selectively deleting a chosen blocklet from the first blocklet repository upon determining that data from the chosen blocklet is present in one or more replacement blocklets in the second blocklet repository and that all references to the chosen blocklet have been replaced by references to the one or more replacement blocklets.

5. The non-transitory computer-readable device of claim 1, where the first blocklet repository has a first index and a first set of recipes for recreating items from the first blocklet repository, and where creating the second deduplication blocklet repository includes creating a second index and a second set of recipes for recreating items from the second deduplication blocklet repository.

6. The non-transitory computer-readable device of claim 5, the method comprising controlling a recreation logic to recreate an item using the second deduplication blocklet repository, the second index, or the second set of recipes without using the first deduplication blocklet repository, without using the first index, and without using the first set of recipes.

7. The non-transitory computer-readable device of claim 5, the method comprising controlling a recreation logic to recreate a file using both the first deduplication blocklet repository and the second deduplication blocklet repository.

8. The non-transitory computer-readable device of claim 1, the method comprising:
    selectively deleting a chosen blocklet from the third deduplication blocklet repository upon determining that data from the chosen blocklet is present in one or more replacement blocklets in the second deduplication blocklet repository and that all references to the chosen blocklet have been replaced by references to the one or more replacement blocklets, and
    controlling a recreation logic to recreate an item using the second deduplication blocklet repository without using the first deduplication blocklet repository and without using the third deduplication blocklet repository.

9. The non-transitory computer-readable medium device of claim 1, where the first deduplication blocklet repository and the second deduplication blocklet repository reside on separate deduplication apparatus.

10. An apparatus, comprising:
a processor;
a memory configured to store a blocklet produced by a deduplication apparatus or process;
a set of logics; and
an interface that connects the processor, the memory, and the set of logics; the set of logics comprising:
a first logic configured to access data in a first existing blocklet data store and a second, different blocklet data store, where the first existing blocklet data store was populated by a first deduplication apparatus or a first process using a first set of deduplication constraints, and where the second, different blocklet data store was populated by a second deduplication apparatus or a second process using a second set of deduplication constraints;
a second logic configured to create blocklets for a new blocklet data store by deduplicating, using a third, different set of deduplication constraints, the first existing blocklet data store and the second existing blocklet data store, and
a third logic configured to selectively reconfigure a data structure associated with the first existing blocklet data store and the second existing blocklet data store.

11. The apparatus of claim 10, where the deduplication application or process was controlled by one or more first deduplication constraints or one or more second deduplication constraints, and where second logic is controlled by one or more third deduplication constraints that differ in at least one way from the one or more first deduplication constraints or the one or more second deduplication constraints.

12. The apparatus of claim 11, where the one or more third deduplication constraints cause the average blocklet size in the new blocklet data store to be smaller than the average blocklet size in the first existing blocklet data store or the second existing blocklet data store.

13. The apparatus of claim 11, where the one or more third deduplication constraints cause the new blocklet data store to have fewer blocklets than the combined total number of blocklets in the first existing blocklet data store and the second existing blocklet data store while providing one hundred percent coverage of data stored in the first existing blocklet data store and the second existing blocklet data store.

14. The apparatus of claim 10, where the first existing blocklet data store and the second existing blocklet data store and the new blocklet data store reside on separate deduplication apparatus.

15. The apparatus of claim 11, the third logic being configured to delete one or more chosen blocklets from the first existing blocklet data store or the second existing blocklet data store upon determining that data covering the one or more chosen blocklets has been placed in the new blocklet data store.

16. The apparatus of claim 11, the third logic being configured to delete all blocklets from the first existing blocklet data store or the second existing blocklet data store upon determining that data covering all the blocklets has been placed in the new blocklet data store.

17. The apparatus of claim 11, the third logic being configured to reconfigure an index associated with an existing blocklet data store and to selectively reconfigure a recipe associated with recreating a file from an existing blocklet data store.

18. The apparatus of claim 11, the third logic being configured to selectively control an apparatus or process that was interacting with the first existing blocklet data store or the second existing blocklet data store to interact instead with the new blocklet data store and to not interact with first existing blocklet data store and the second existing blocklet data store.

* * * * *